United States Patent
Kaspar et al.

(10) Patent No.: US 6,861,490 B2
(45) Date of Patent: Mar. 1, 2005

(54) AQUEOUS EMULSION POLYMERIZATION IN THE PRESENCE OF ETHERS AS CHAIN TRANSFER AGENTS TO PRODUCE FLUOROPOLYMERS

(75) Inventors: Harald Kaspar, Burgkirchen (DE); Klaus Hintzer, Kastl (DE); Karl-Dieter Weilandt, Minneapolis, MN (US); Jost Krichel, Winhöring (DE); Erik Peters, Geilenkirchen (DE); Lisa P. Chen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/867,256

(22) Filed: Jun. 14, 2004

(65) Prior Publication Data

US 2004/0235986 A1 Nov. 25, 2004

Related U.S. Application Data

(62) Division of application No. 10/136,912, filed on Apr. 30, 2002, now Pat. No. 6,750,304.
(60) Provisional application No. 60/288,248, filed on May 2, 2001.

(51) Int. Cl.$^7$ ................................................ C08F 16/24
(52) U.S. Cl. ...................... 526/247; 526/209; 526/250; 526/255; 525/199; 525/240; 525/326.2; 525/328.9
(58) Field of Search ................................ 526/209, 247, 526/250, 255; 525/199, 240, 326.2, 328.9

(56) References Cited

U.S. PATENT DOCUMENTS

| | | |
|---|---|---|
| 3,306,879 A | 2/1967 | Pattison |
| 3,546,186 A | 12/1970 | Gladding et al. |
| 3,635,926 A | 1/1972 | Gresham et al. |
| 3,642,742 A | 2/1972 | Carlson |
| 3,855,191 A | 12/1974 | Doughty, Jr. et al. |
| 3,876,654 A | 4/1975 | Pattison |
| 4,123,602 A | 10/1978 | Ukihashi et al. |
| 4,233,421 A | 11/1980 | Worm |
| 4,262,101 A | 4/1981 | Hartwimmer et al. |
| 4,381,387 A | 4/1983 | Sulzbach |
| 4,439,385 A | 3/1984 | Kuhls et al. |
| 4,499,249 A | 2/1985 | Nakagawa et al. |
| 4,564,662 A | 1/1986 | Albin |
| 4,588,796 A | 5/1986 | Wheland |
| 4,690,994 A * | 9/1987 | Masuda et al. ............. 526/254 |
| 4,766,190 A | 8/1988 | Morita et al. |
| 4,861,845 A | 8/1989 | Slocum et al. |
| 4,912,171 A | 3/1990 | Grootaert et al. |
| 4,985,520 A * | 1/1991 | Hayashi et al. ............. 526/254 |
| 5,086,123 A | 2/1992 | Guenthner et al. |
| 5,106,911 A | 4/1992 | Chapman, Jr. et al. |
| 5,208,305 A | 5/1993 | Grootaert |
| 5,256,745 A | 10/1993 | Grootaert |
| 5,262,490 A | 11/1993 | Kolb et al. |
| 5,453,477 A | 9/1995 | Oxenrider et al. |
| 5,464,904 A | 11/1995 | Chapman, Jr. et al. |
| 5,530,078 A | 6/1996 | Felix et al. |
| 5,565,512 A | 10/1996 | Saito et al. |
| 5,591,804 A | 1/1997 | Coggio et al. |
| 5,608,022 A | 3/1997 | Nakayama et al. |
| 5,663,255 A | 9/1997 | Anolick et al. |
| 5,668,221 A | 9/1997 | Saito et al. |
| 5,670,593 A | 9/1997 | Araki et al. |
| 5,677,389 A | 10/1997 | Logothetis et al. |
| 5,710,217 A | 1/1998 | Blong et al. |
| 5,910,552 A | 6/1999 | Saito et al. |
| 5,929,169 A | 7/1999 | Jing et al. |
| 6,310,141 B1 | 10/2001 | Chen et al. |
| 6,693,152 B2 * | 2/2004 | Kaspar et al. ................ 526/78 |
| 6,716,945 B2 * | 4/2004 | DeSimone et al. ......... 526/255 |
| 6,720,360 B1 | 4/2004 | Grootaert et al. |
| 2003/0018148 A1 * | 1/2003 | Kaspar et al. ............... 526/209 |
| 2004/0087703 A1 * | 5/2004 | Kaspar et al. ............... 524/458 |
| 2004/0132939 A1 * | 7/2004 | Kaspar et al. ............... 526/247 |

FOREIGN PATENT DOCUMENTS

| | | |
|---|---|---|
| EP | 0 661 304 A1 | 7/1995 |
| EP | 0 769 521 A1 | 4/1997 |
| EP | 0 784 064 A1 | 7/1997 |
| EP | 0 964 009 A1 | 12/1999 |
| JP | 71-011031 B | 12/1971 |
| JP | 1-129005 | 5/1989 |
| WO | WO 97/17381 | 5/1997 |
| WO | WO 00/09603 | 2/2000 |
| WO | WO 00/32655 | 6/2000 |
| WO | WO 00/69969 | 11/2000 |

OTHER PUBLICATIONS

Bretherick, L. in *Handbook of Reactive Chemical Hazards*; p. 549, Butterworth–Heinemann, Ltd. 1990.
*Modern Fluoropolymers*, edited by John Scheirs, Wiley Science, 1997 p. 377–378.

* cited by examiner

*Primary Examiner*—Samuel A. Acquah
(74) *Attorney, Agent, or Firm*—Brian E. Szymanski

(57) ABSTRACT

The present invention provides a method of making a fluoropolymer comprising repeating units derived from one or more gaseous fluorinated monomers. The method comprises an aqueous emulsion polymerization of gaseous fluorinated monomers in the presence of an ether selected from the group consisting of dimethyl ether (DME), methyl tertiary butyl ether (MTBE) and mixtures thereof.

5 Claims, No Drawings

AQUEOUS EMULSION POLYMERIZATION IN THE PRESENCE OF ETHERS AS CHAIN TRANSFER AGENTS TO PRODUCE FLUOROPOLYMERS

CROSS REFERENCE TO RELATED APPLICATION

This application is a Division of Ser. No. 10/136,912 filed Apr. 30, 2002 now U.S. Pat. No. 6,750,304, and which claims priority to U.S. Provisional Patent Application No. 60/288,248, filed May 2, 2001.

FIELD OF THE INVENTION

The present invention relates to an improvement of the aqueous emulsion polymerization for making fluoropolymers. In particular, the present invention relates to the use of particular ethers as chain transfer agents in the aqueous emulsion polymerization for making fluoropolymers with improved properties, in particular fluorothermoplasts and fluoroelastomers with improved properties.

BACKGROUND OF THE INVENTION

Fluoropolymers, i.e. polymers having a fluorinated backbone, have been long known and have been used in a variety of applications because of several desirable properties such as heat resistance, chemical resistance, weatherability, UV-stability etc. The various applications of fluoropolymers are for example described in "Modern Fluoropolymers", edited by John Scheirs, Wiley Science 1997.

The known fluoropolymers include in particular fluoroelastomers and fluorothermoplasts. Such fluoropolymers include copolymers of a gaseous fluorinated olefin such as tetrafluoroethylene (TFE), chlorotrifluoroethylene (CTFE) and/or vinylidene fluoride (VDF) with one or more comonomers such as for example hexafluoropropylene (HFP) or perfluorovinyl ethers (PVE) or non-fluorinated olefins such as ethylene (E) and propylene (P). The term "copolymer" in connection with the present invention should generally be understood to mean a polymer comprising repeating units derived from the recited monomers without excluding the option of other further repeating units being present that derive from other monomers not explicitly recited. Accordingly, for example the term 'copolymer of monomers A and B' includes binary polymers of A and B as well as polymers that have further monomers other than A and B such as for example terpolymers.

Examples of fluoroelastomers include for example copolymers of TFE and PVE and copolymers of VDF and HFP. The fluoroelastomers may also contain cure site components so that they may be cured if desired. Applications of fluoroelastomers include for example coatings, use as gaskets and seals as well as use as polymer processing aids (PPA). A commercially available processing aid includes for example copolymers of VDF and HFP available from Dyneon LLC under the brand DYNAMAR™ PPA.

Examples of fluorothermoplasts include copolymers of TFE and E(ETFE), copolymers of TFE and HFP (FEP), copolymers of TFE, HFP and VDF (THV) and perfluoroalkoxy copolymers (PFA). Examples of applications of fluorothermoplasts include for example coating applications such as for example for coating outdoor fabric and use as insulating material in wire and cable insulation. In particular ETFE copolymers have desirable properties as insulating material. Further applications of fluorothermoplasts include making of tubes such as for example fuel hoses, extrusion of films and injection molded articles. The extruded fluorothermoplastic articles, in particular films may further be subjected to an e-beam radiation to partially cure the fluorothermoplast.

Several methods are known to produce the fluoropolymers. Such methods include suspension polymerization as disclosed in e.g. U.S. Pat. No. 3,855,191, U.S. Pat. No. 4,439,385 and EP 649863; aqueous emulsion polymerization as disclosed in e.g. U.S. Pat. No. 3,635,926 and U.S. Pat. No. 4,262,101; solution polymerization as disclosed in U.S. Pat. No. 3,642,742, U.S. Pat. No. 4,588,796 and U.S. Pat. No. 5,663,255; polymerization using supercritical $CO_2$ as disclosed in JP 46011031 and EP 964009 and polymerization in the gas phase as disclosed in U.S. Pat. No. 4,861,845.

Currently, the most commonly employed polymerization methods include suspension polymerization and especially aqueous emulsion polymerization. Aqueous emulsion polymerization has been generally preferred for the production of fluoropolymers because the process is more environmental friendly than solution polymerization in organic solvents and furthermore allows for easy recovery of the resulting polymer. However, for certain applications, the fluoropolymers produced via the aqueous emulsion polymerization process may have somewhat inferior properties relative to similar polymers produced via solution polymerization. For example, copolymers of E and TFE produced according to the solution polymerization disclosed in U.S. Pat. No. 4,123,602 generally have a better heat resistance than similar polymers produced via aqueous emulsion polymerization.

The aqueous emulsion polymerization normally involves the polymerization in the presence of a fluorinated surfactant, which is generally used to ensure the stabilisation of the polymer particles formed. The suspension polymerization generally does not involve the use of surfactant but results in substantially larger polymer particles than in case of the aqueous emulsion polymerization. Thus, the polymer particles in case of suspension polymerization will quickly settle out whereas in case of dispersions obtained in emulsion polymerization generally display good latex stability over a long period of time.

Although the aqueous emulsion polymerization generally involves the use of a fluorinated surfactant; there is also known an aqueous emulsion polymerization process wherein no fluorinated surfactant is added to the polymerization system. Such a polymerization is described in for example U.S. Pat. No. 5,453,477 and WO 97/17381. It is taught therein that through careful selection of the initiation system, the polymer particles are self-stabilized through the ionic endgroups of the polymers produced in the process.

To tailor the molecular weight of the resulting fluoropolymer, it has been known to use chain transfer agents. For example, U.S. Pat. No. 4,766,190 discloses an aqueous emulsion polymerization to make fluoroelastomers. The chain transfer agents disclosed include $C_4$–$C_6$ hydrocarbons, alcohols, ethers, esters, ketones and halocarbons.

U.S. Pat. No. 4,262,101 also discloses an aqueous emulsion polymerization process. Chain transfer agents used here include halocarbons, aliphatic carboxylic acid esters, ketones, alcohols, malonic esters and lower dialkylglycol.

U.S. Pat. No. 5,608,022 discloses the preparation of a copolymer of TFE and a comonomer of the formula $CF_2=CF-O-(CF_2CF(CF_3)-O)_n-(CF_2)_m-Z$ wherein n is 1 or 2, m is 24 and Z is $CO_2R$ or $SO_2F$ with R being $C_1$–$C_3$ alkyl. The polymerization is carried out by dispersing the comonomer in water to a droplet size of less than 2 mm and copolymerizing with TFE in the presence of a $C_1$–$C_6$ alcohol or a $C_2$–$C_6$ ether. The alcohols are being disclosed as the preferred chain transfer agent and the chain transfer agents are being mixed as liquid with the aqueous polymerization medium. It is disclosed that the copolymer can be produced avoiding formation of different kind of polymers in the aqueous medium, in particular the formation of homopolymer of TFE is avoided. In the examples, n-propyl ether is used as a chain transfer agent. However ethers such as n-propyl ether and diethyl ether have been found to cause building of hazardous peroxides which may present a safety issue when used on an industrial scale to manufacture fluoropolymers. The polymers disclosed in this US patent are used as a base material of a salt electrolytic cation-exchanged film.

Alkanes have also been disclosed as chain transfer agents in an aqueous emulsion polymerization. For example, U.S. Pat. No. 3,635,926 discloses the use methane or ethane to make copolymers of tetrafluoroethylene and perfluorovinyl ethers.

WO 00/32655 discloses the use of hydrofluoroethers (HFEs) for the fluoromonomer emulsion-polymerization. These HFEs are taught to be superior to common chain transfer agents such as chloroform, in being safer and environmentally benign. These liquid components are also taught to be superior to gaseous chain transfer agents such as ethane because they do not enter the fluoromonomer gas recycle streams. However, the chain transfer activity of HFEs is fairly low, making them generally only practical in producing perfluorinated polymers where only a low chain transfer activity is desired and needed. When using the HFEs in producing partially fluorinated fluoropolymers, one will generally need a large amount of chain transfer, which is undesirable.

In JP 1-129005 there is disclosed the use of dialkyl ether chain transfer agents that have not more than 6 carbon atoms in a suspension polymerization of vinylidene fluoride to produce homo- or copolymers of vinylidene fluoride. Specifically disclosed ethers include dimethyl ether and diethyl ether with the latter being preferred. The polymerization temperature is taught to be between 10 and 25° C. It is disclosed that the use of these chain transfer agents allow for control of molecular weight of the vinylidene fluoride polymer without substantially affecting the polymerization rate and the heat resistance of the polymer produced.

A commonly employed chain transfer agent in the production of fluorothermoplasts and fluoroelastomers is diethylmalonate. The use of diethylmalonate is for example recommended in EP 43 948 to produce copolymers of TFE and E, such as for example copolymers of TFE, E, HFP and PVE. However, it has been found that fluoropolymers produced in the presence of this chain transfer agent are susceptible to discoloration, may produce an unpleasant smell and have a high amount of extractable compounds. Also, the fluoropolymers so produced have been found to have a large amount of low molecular weight fraction which causes processing difficulties of the fluoropolymer. Furthermore, the yield of these polymers when produced through aqueous emulsion polymerization in the presence of diethylmalonate would desirably be improved.

Further known chain transfer agents used in aqueous emulsion polymerization include silanes as disclosed in U.S. Pat. No. 5,256,745 and U.S. Pat. No. 5,208,305. However, also in this instance, it was found that the fluoropolymers produced have undesirable properties such as discoloration and low purity, in particular high amounts of extractable compounds. Additionally, the process disclosed in these patents to; produce a bimodal molecular weight distribution of the fluoropolymer is cumbersome, e.g., the polymerization time is long and the polymerization initiation is often retarded.

It would thus be desirable to improve the aqueous emulsion polymerization process so as to produce fluoropolymers with improved properties. It is in particular a desire to produce fluoropolymers that have a high purity, less extractable compounds, less smell, improved processing and less discoloration. It is further desirable to produce partially fluorinated fluoroelastomers and fluorothermoplasts that have improved mechanical and physical properties. Desirably, the chain transfer agents have a high chain transfer activity such that they can be used in low amounts.

SUMMARY OF THE INVENTION

The present invention provides a method of making a fluoropolymer comprising repeating units derived from one or more gaseous fluorinated monomers. The method comprises an aqueous emulsion polymerization of the gaseous fluorinated monomer(s) optionally in combination with one or more liquid fluorinated monomers in the presence of an ether selected from the group consisting of dimethyl ether (DME), methyl tertiary butyl ether (MTBE) and mixtures thereof. It has been found that by using the specific ethers as a chain transfer agent, improved fluoropolymers, in particular fluorothermoplasts and fluoroelastomers can be produced. The fluoropolymers produced with the process of the present invention generally have a high purity and low amounts of extractable compounds including residual chain transfer agent and low molecular weight fractions. The ether chain transfer agents do not act as swelling agent for the polymer, in contrast to e.g. diethylmalonate, and are therefore more easy to remove after polymerization. The fluoropolymers produced generally are more easy to process, produce less smell and are better performing. For example, it has been found that the process of this invention allows for making fluorothermoplastic copolymers of E and TFE that have equal or better physical and mechanical properties such as e.g. heat resistance as fluorothermoplastic copolymers of E and TFE produced by polymerizations in organic solvent. Thus, the fluorothermoplastic copolymers of E and TFE produced with the present invention have excellent properties for use in wire and cable insulation. Further, it has been found that during extrusion of fluoropolymers made according to the invention, less pressure fluctuations occur and the amount of die drool formed is generally reduced as well.

Additionally, the fluoropolymers can be produced in a convenient and fast way and at good yield (e.g. high solids contents), making the process also attractive from an economic perspective. Further because of the higher purity and lower amount of extractable compounds, the polymers produced with the process of this invention will generally also be more environmental friendly. Also, DME and MTBE are ethers that do not generally form peroxide (see Bretherick, L. in: Handbook of reactive chemical hazards; p. 549, Butterworth-Heinemann Ltd 1990, ISBN 0,7506,0706,8) and can therefore more safely be handled than other ethers, in particular other dialkyl ethers, in the polymerization process of this invention.

The ethers are particularly suitable for producing partially fluorinated polymers and because of their high chain transfer activity can be used in low amounts. Additionally, the ethers have high water solubility and as a result thereof, will despite their gaseous nature not readily enter the gas stream of gaseous fluorinated monomers that may be used in an emulsion polymerisation process.

Additionally, it has been found that the ethers can be used to produce fluoropolymers, in particular fluoroelastomers that have a multi-modal, e.g. a bimodal, molecular weight distribution in a single step polymerization. By 'single step' polymerization is meant that the polymerization can be carried out without having to interrupt the polymerization reaction as has been practiced in the prior art where, in order to produce bimodal fluoropolymers, a first polymer is produced and separately a second one which are then blended together. Further, such multi-modal polymers can be produced with a low level of extractable compounds.

Thus, in a further aspect, the invention also relates to a fluoropolymer having a multi-modal molecular weight distribution, in particular a bimodal molecular weight distribution, and comprising less than 12% by weight, preferably less than 10% by weight, most preferably less than 8% by weight based on the weight of fluoropolymer of extractable compounds as measured by leaving the fluoropolymer in methyl ethyl ketone for 70 hours at 40° C.

The process of the present invention also allows for a convenient manufacturing of so-called "core-shell" polymers by feeding different monomers at different stages during the polymerization or by changing the ratio of the monomers during the polymerization process. Using the ether chain transfer agents, an amorphous (elastomeric) core of a desired molecular weight may be polymerized during a first stage of the polymerization and during a second stage later in the polymerization process a semi-crystalline shell with a desired molecular weight may be polymerized. Of course the core can also be semi-crystalline and the shell can be made amorphous (as disclosed in U.S. Pat. No. 6,310,141) or both core and shell may be semi-crystalline (as disclosed in WO 00/69969) or amorphous. The process of the present invention allows for a convenient manufacturing of such core-shell polymers in a one single step polymerization.

Finally, such core-shell polymers can be produced with a low amount of extractable compounds and the invention thus also relates to such core-shell polymers.

DETAILED DESCRIPTION OF THE INVENTION

According to the present invention, DME or MTBE or a mixture thereof is used as a chain transfer in the aqueous emulsion polymerization.

The amount of chain transfer agent used in the polymerization is generally selected to achieve the desired molecular weight of the fluoropolymer. Typically, the amount of chain transfer agent used will be between 0.1 and 20 g per kg of polymer produced, more preferably between 0.3 and 9 g per kg of polymer produced.

Generally, the aqueous emulsion polymerization process is carried out in the presence of a fluorinated surfactant, typically a non-telogenic fluorinated surfactant. Suitable fluorinated surfactants include any fluorinated surfactant commonly employed in aqueous emulsion polymerization. Particularly preferred fluorinated surfactants are those that correspond to the general formula:

$$Y\text{---}R_f\text{---}Z\text{---}M \tag{III}$$

wherein Y represents hydrogen, Cl or F; $R_f$ represents a linear or branched perfluorinated alkylene having 4 to 10 carbon atoms; Z represents $COO^-$ or $SO_3^-$ and M represents an alkali metal ion or an ammonium ion. Most preferred fluorinated surfactants for use in this invention are the ammonium salts of perfluorooctanoic acid and perfluorooctane sulphonic acid. Mixtures of fluorinated surfactants can be used.

The aqueous emulsion polymerization process is generally conducted in the commonly known manner. The reactor vessel is typically a pressurizable vessel capable of withstanding the internal pressures during the polymerization reaction. Typically, the reaction vessel will include a mechanical agitator, which will produce thorough mixing of the reactor contents and heat exchange system.

Any quantity of the fluoromonomer(s) may be charged to the reactor vessel. The monomers may be charged batchwise or in a continuous or semicontinuous manner. By semicontinuous is meant that a plurality of batches of the monomer are charged to the vessel during the course of the polymerization. The independent rate at which the monomers are added to the vessel will depend on; the consumption rate of the particular monomer with time. Preferably, the rate of addition of monomer will equal the rate of consumption of monomer, i.e. conversion of monomer into polymer.

The reaction vessel is charged with water, the amounts of which are not critical. To the aqueous phase there is generally also added the fluorinated surfactant which is typically used in amount of 0.01% by weight to 1% by weight. The chain transfer agent is typically charged to the reaction vessel prior to the initiation of the polymerization. Further additions of chain transfer agent in a continuous or semi-continuous way during the polymerization may also be carried out. For example, a fluoropolymer having a bimodal molecular weight distribution is conveniently prepared by first polymerizing fluorinated monomer in the presence of an initial amount of chain transfer agent and then adding at a later point in the polymerization further chain transfer agent together with additional monomer.

The polymerization is usually initiated after an initial charge of monomer by adding an initiator or initiator system to the aqueous phase. For example peroxides can be used as free radical initiators. Specific examples of peroxide initiators include, hydrogen peroxide, sodium or barium peroxide, diacylperoxides such as diacetylperoxide, dipropionylperoxide, dibutyrylperoxide, dibenzoylperoxide, benzoylacetylperoxide, diglutaric acid peroxide and dilaurylperoxide, and further water soluble per-acids and water soluble salts thereof such as e.g. ammonium, sodium or potassium salts. Examples of per-acids include peracetic acid. Esters of the peracid can be used as well and examples thereof include tert.-butylperoxyacetate and tert.-butylperoxypivalate. A further class of initiators that can be used are water soluble azo-compounds. Suitable redox systems for use as initiators include for example a combination of peroxodisulphate and hydrogen sulphite or disulphite, a combination of thiosulphate and peroxodisulphate or a combination of peroxodisulphate and hydrazine. Further initiators that can be used are ammonium- alkali- or earth alkali salts of persulfates, permanganic or manganic acid or manganic acids. The amount of initiator employed is typically between 0.03 and 2% by weight, preferably between 0.05 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper and silver may preferably also be added.

During the initiation of the polymerization reaction, the sealed reactor vessel and its contents are pre-heated to the reaction temperature. Preferred polymerization temperatures are from 30° C. to 80° C. and the pressure is typically between 4 and 30 bar, in particular 8 to 20 bar.

The aqueous emulsion polymerization system may further comprise auxiliaries, such as buffers and complex-formers.

The amount of polymer solids that can be obtained at the end of the polymerization is typically between 10% and 45% by weight, preferably between 20% and 40% by weight and the average particle size of the resulting fluoropolymer is typically between 50 nm and 500 nm.

According to a further embodiment of the present invention, the aqueous emulsion polymerization may also be carried out without the addition of a fluorinated surfactant. Aqueous emulsion polymerization that is carried out without the addition of a fluorinated surfactant can be practiced as disclosed in U.S. Pat. No. 5,453,477 and WO 97/17381. According to the emulsifier free aqueous emulsion polymerization disclosed in WO 97/17381 a radical initiator system of a reducing agent and oxidizing agent is used to initiate the polymerization and the initiator system is added in one or more further charges during the polymerization. The ionic end groups formed as a result of the initiator system used in WO 97/17381 are taught to stabilise the fluoropolymer particles in the emulsifier free aqueous emulsion process. Suitable oxidizing agents that can be used include persulfates such as potassium sulfate and ammonium sulfate, peroxides such as hydrogen peroxide, potassium peroxide, ammonium peroxide, tertiary butyl hydroperoxide, cumene peroxide and t-amyl hydroperoxide, manganese triacetate, potassium permanganate, ascorbic acid and mixtures thereof. Suitable reducing agents include sodium sulfites such as sodium bisulfite, sodium sulfite, sodium pyrosulfite, sodium-m-bitsulfite, ammonium sulfite monohydrate and sodium thiosulphate, hydroxylamine, hydrazine, ferrous iron, organic acids such as oxalic acid and citric acid and mixtures thereof The amount of oxidizing agent added in the initial charge is typically between 10 and 10000 ppm. The amount of reducing agent in the initial charge is typically also between 10 and 10000 ppm. At least one further charge of oxidizing agent and reducing agent is added to the polymerization system in the course of the polymerization. The further addition(s) may be done batchwise or the further addition may be continuous.

According to a preferred embodiment, an emulsifier free (i.e. without added emulsifier) aqueous polymerization involves an initial charge of an oxidizing agent and a reducing agent and one or more further charges of either the reducing agent or oxidizing agent, but not both, in the course of the polymerization. This embodiment of the invention has the advantage that the aqueous polymerization process can be conducted in an easy and convenient way while still yielding stable polymer dispersions at a high rate and in good yield.

The aqueous emulsion polymerization process of the present invention comprises the polymerization of at least one gaseous fluorinated monomer. According to a particular embodiment of the present invention, the aqueous emulsion polymerization involves a copolymerization of a gaseous fluorinated monomer such as tetrafluoroethylene, chlorotrifluoroethylene and vinylidene fluoride and a comonomer selected from the group consisting of vinylidene fluoride, perfluoroalkyl vinyl monomers, ethylene, propylene, fluorinated allyl ethers, in particular perfluorinated allyl ethers and fluorinated vinyl ethers, in particular perfluorovinyl ethers. Additional fluorinated and non-fluorinated monomers can be included as well. It will be understood by one skilled in the art that when the polymerization involves vinylidene fluoride, the gaseous fluorinated monomer would generally be either tetrafluoroethylene or chlorotrifluoroethylene or a comonomer other than vinylidene fluoride would have to be selected to obtain a copolymer. Examples of perfluorovinyl ethers that can be used in the process of the invention include those that correspond to the formula:

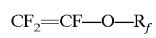

$CF_2=CF-O-R_f$ wherein $R_f$ represents a perfluorinated aliphatic group that may contain one or more oxygen atoms.

Particularly preferred perfluorinated vinyl ethers correspond to the formula:

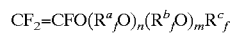

$CF_2=CFO(R^a_fO)_n(R^b_fO)_mR^c_f$ wherein $R^a_f$ and $R^b_f$ are different linear or branched perfluoroalkylene groups of 1–6 carbon atoms, in particular 2 to 6 carbon atoms, m and n are independently 0–10 and $R^c_f$ is a perfluoro alkyl group of 1–6 carbon atoms. Specific examples of perfluorinated vinyl ethers include perfluoro methyl vinyl ether (PMVE), perfluoro n-propyl vinyl ether (PPVE-1), perfluoro-2-propoxypropylvinyl ether (PPVE-2), perfluoro-3-methoxy-n-propylvinyl ether, perfluoro-2-methoxy-ethylvinyl ether and $CF_3-(CF_2)_2-O-CF(CF_3)-CF_2-O-CF(CF_3)-CF_2-O-CF=CF_2$.

Suitable perfluoroalkyl vinyl monomers correspond to the general formula:

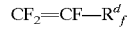

$CF_2=CF-R^d_f$ or

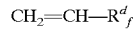

$CH_2=CH-R^d_f$ wherein $R^d_f$ represents a perfluoroalkyl group of 1 to 10, preferably 1 to 5 carbon atoms. A typical example of a perfluoroalkyl vinyl monomer is hexafluoropropylene.

The process of the present invention is preferably used for producing fluoropolymers that have a is partially fluorinated backbone, i.e. part of the hydrogen atoms on the backbone are replaced with fluorine. Accordingly, the aqueous polymerization process of the present invention will generally involve at least one monomer that has an ethylenically unsaturated group that is partially fluorinated (e.g. vinylidene fluoride) or not fluorinated (e.g. ethylene or propylene). It has been found that the ethers are highly effective chain transfer agent for use with monomers that have a non-fluorinated or partially fluorinated ethylenically unsaturated group. On the other hand, they can be used to produce perfluoropolymers, i.e. polymers that have a fully fluorinated backbone.

Examples of fluoropolymers that are preferably produced with the process of the invention include a copolymer of vinylidene fluoride and hexafluoropropylene, a copolymer of tetrafluoroethylene and vinylidene fluoride, a copolymer of chlorotrifluoroethylene and vinylidene fluoride, a copolymer of tetrafluoroethylene and ethylene, a copolymer of tetrafluoroethylene and propylene, a copolymer of vinylidene fluoride and perfluorovinyl ether (e.g. PMVE, PPVE-1, PPVE-2 or a combination of PPVE-1 and PPVE-2), a terpolymer of tetrafluoroethylene, ethylene or propylene and perfluorovinyl ether (e.g. PMVE, PPVE-1, PPVE-2 or a combination of PPVE-1 and PPVE-2), a copolymer of tetrafluoroethylene, ethylene or propylene and hexafluoropropylene, a copolymer of tetrafluoroethylene, vinylidene fluoride and hexafluoropropylene, a copolymer of vinylidene fluoride, tetrafluoroethylene and perfluorovinyl ether (e.g. PMVE, PPVE-1, PPVE-2 or a combination of PPVE-1 and PPVE-2), and a co-polymer of a copolymer of tetrafluoroethylene, ethylene or propylene, hexafluoropropylene and perfluorovinyl ether (e.g. PMVE, PPVE-1, PPVE-2 or a combination of PPVE-1 and PPVE-2).

The fluoropolymers that can be produced with the process of the invention are generally amorphous fluoropolymers or semi-crystalline fluoropolymers. A fluoroelastomer is generally a fluoropolymer having elastomeric properties upon curing and will generally not display a melting peak or will have a very minor melting peak, i.e. the fluoroelastomer will generally have little or no crystallinity. Fluorothermoplasts are polymers that generally have a pronounced melting peak and that generally have crystallinity. The fluorothermoplasts according to this invention will generally be melt processable, i.e. they will typically have a melt flow index of at least 0.1 g/10 min. as measured with a load of 5 kg and at a temperature of 265° C. as set out in the examples below. Whether the particular fluoropolymer produced is a fluorothermoplast or fluoroelastomer, depends on the nature and amounts of the monomers from which the fluoropolymer is derived as is well known to those skilled in the art.

The fluoropolymers produced with the process of the invention can have a multi-modal including a bimodal molecular weight distribution which can provide advantageous processing properties. In particular, such multi-modal fluoropolymers may be produced by charging no or a small initial amount of ether at the beginning of the polymerization, e.g. prior to the addition of initiator, and one or more further charges of the ether during the polymerization. Accordingly, fluoropolymers with a multi-modal molecular weight distribution can conveniently be produced in a single step polymerization.

Fluorothermoplasts

Fluorothermoplasts that can be produced with the process of the present invention generally will have a melting point between 50° C. and 300° C., preferably between 60° C. and 280° C. Particularly desirable fluorothermoplasts that can be produced with the process of this invention include for example copolymers of E and TFE, copolymers of TFE and VDF, copolymers of VDF and HFP, copolymers of CTFE and VDF, copolymers of TFE, E and HFP and copolymers of TFE, HFP and VDF.

Fluorothermoplasts that may be produced in connection with the present invention generally have the advantage of being less susceptible to discoloration, having a decreased amount of extractable compounds and having a high purity and generally are more homogeneous, e.g. the polymer doesn't show a drift of the melt flow index during polymerizaton. Accordingly, the fluorothermoplasts are generally more easy to process and generally have high temperature resistance, high chemical resistance, same or improved electrical properties good mold release and reduced amount of smell. Further, the fluorothermoplasts when extruded typically produce less die drool.

The fluorothermoplastic polymers that can be obtained with the process of the present invention can be used in any of the applications in which fluorothermoplasts are typically used. For example, the fluorothermoplasts can be used to insulate wires and cables. In particular a copolymer of E and TFE produced with the process of this invention has been found to have highly desirable properties to insulate wires. To produce a cable or wire insulated with a fluorothermoplast according to the invention, in particular a copolymer of E and TFE, the fluorothermoplast can be melt extruded around a central conductor, e.g. copper wire. A conductive metallic layer may be formed around the extruded fluorothermoplast layer to produce for example a heating cable.

The fluorothermoplastic polymers produced may further be used to make hoses, in particular fuel hoses and pipes and can be used in particular in heat exchange applications. The fluorothermoplasts may also be extruded into a film or into so-called mono filaments which may then subsequently be woven into a woven fabric. Still further, the fluorothermoplasts can be used in coating applications for example to coat outdoor fabric or to make injection molded articles.

Fluoroelastomers

In addition to fluorothermoplasts, the process of the present invention also allows for making fluoroelastomers with desirable and improved properties. In particular, the fluoroelastomers produced will generally have a higher purity, a lesser amount of extractable compounds, will generally be less susceptible to discoloration, more easy to process and will typically produce less smell. Additionally, the mechanical and physical properties of the fluoroelastomers may be improved by the process of the invention. For example, a curable fluoroelastomer produced according to the invention may have an improved compression set and may have same or improved permeation properties.

Fluoroelastomers that can be produced in connection with the present invention include elastomers that are not fully fluorinated. The fluoroelastomer may include a cure site component, in particular one or more cure sites derived from a cures site monomer (CSM) to provide a curable fluoroelastomer. Specific examples of elastomeric copolymers include copolymers comprising a combination of monomers as follows: VDF-HFP, VDF-TFE-HFP, VDF-TFE-HFP-CSM, VDF-TFE-PMVE-CSM, TFE-P, E-TFE-PMVE-CSM and TFE-VDF-P-CSM.

To obtain a curable fluoroelastomer, a further cure site component may be included in the polymerization reaction to obtain a curable fluoroelastomer. Generally, the cure site component will be used in small amounts, typically in amounts so as to obtain a fluoroelastomer that has between 0.1 and 5 mol % of cure sites, preferably 0.2 to 3 mol % and most preferred 0.5–2 mol %.

The cure site component may comprise a nitrile group-containing cure site monomer. The cure site component can be partially or fully fluorinated. Preferred useful nitrile group-containing cure site monomers include nitrile-containing fluorinated olefins and nitrile-containing fluorinated vinyl ethers, such as depicted below:

$CF_2=CF-(CF_2)_n-O-R_f-CN$ $CF_2=CFO(CF_2)_lCN$ $CF_2=CFO[CF_2CF(CF_3)O]_g(CF_2O)_vCF(CF_3)CN$ $CF_2=CF[OCF_2CF(CF_3)]_kO(CF_2)_uCN$ where, in reference to the above formulas: n=1 to 5; l=2–12; g=0–4; k=1–2; v=0–6; and u=1–4, $R_f$ is a linear or branched perfluoroalkylene or a bivalent perfluoroether group. Representative examples of such a monomer include perfluoro (8-cyano-5-methyl-3,6-dioxa-1-octene), $CF_2=CFO(CF_2)_5CN$, and $CF_2=CFO(CF_2)_3OCF(CF_3)CN$.

Alternatively, the cure site component may comprise a fluorinated monomer having a halogen capable of participation in a peroxide cure reaction. Typically the halogen is bromine or iodine. Suitable cure-site components include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1. Examples of other suitable cure site components include $CF_2$=$CFOCF_2CF_2Br$, $CF_2$=$CFOCF_2CF_2CF_2Br$, and $CF_2$=$CFOCF_2CF_2CF_2OCF_2CF_2Br$. Preferably, all or essentially all of these components are ethylenically unsaturated monomers.

A curable fluoroelastomer composition will generally include the curable fluoroelastomer and one or more curatives such as the peroxide and/or one or more catalysts depending on the type of cure sites contained in the curable fluoroelastomer. Suitable peroxide curatives are those which generate free radicals at curing temperatures. A dialkyl peroxide or a bis(dialkyl peroxide) which decomposes at a temperature above 50° C. is especially preferred. In many cases it is preferred to use a di-tertiarybutyl peroxide having a tertiary carbon atom attached to peroxy oxygen. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides, can be selected from such compounds as dicumyl peroxide, dibenzoyl peroxide, tertiarybutyl perbenzoate, α,α'-bis(t-butylperoxy-diisopropylbenzene), and di[1,3-dimethyl-3-(t-butylperoxy)-butyl]carbonate. Generally, about 1–3 parts of peroxide per 100 parts of perfluoroelastomer is used.

Another material which is usually blended with the composition as a part of the curative system is a coagent composed of a polyunsaturated compound which is capable of cooperating with the peroxide to provide a useful cure. These coagents can be added in an amount equal to 0.1 and parts per hundred parts perfluoroelastomer, preferably between 2–5 parts per hundred parts fluoroelastomer. Examples of useful coagents include triallyl cyanurate; triallyl isocyanurate; tri(methylallyl isocyanurate; tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. Particularly useful is triallyl isocyanurate. Other useful coagents include the bis-olefins disclosed in EPA 0 661 304 A1, EPA 0 784 064 A1 and EPA 0 769 521 A1.

When the fluoroelastomer includes a nitrile containing cure site component, a catalyst comprising one or more ammonia-generating compounds may be used to cause curing. "Ammonia-generating compounds" include compounds that are solid or liquid at ambient conditions but that generate ammonia under conditions of cure. Such compounds include, for example, aminophenols as disclosed in U.S. Pat. No. 5,677,389, ammonia salts (U.S. Pat. No. 5,565,512), amidoxines (U.S. Pat. No. 5,668,221), imidates, hexamethylene tetramine (urotropin), dicyan diamid, and metal-containing compounds of the formula:

where $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and v is an integer from 1 to about 7. Still further ammonia generating compounds are disclosed in PCT 00/09603.

Fluoroelastomers, in particular VDF containing fluoroelastomers, may further be cured using a polyhydroxy curing system. In such instance, it will not be required that the fluoroelastomer includes cure site components. The polyhydroxy curing system generally comprises one or more polyhydroxy compounds and one or more organo-onium accelerators. The organo-onium compounds useful in the present invention typically contain at least one heteroatom, i.e., a non-carbon atom such as N, P, S, O, bonded to organic or inorganic moieties. One useful class of quaternary organoonium compounds broadly comprises relatively positive and relatively negative ions wherein a phosphorus, arsenic, antimony or nitrogen generally comprises the central atom of the positive ion, and the negative ion may be an organic or inorganic anion (e.g., halide, sulfate, acetate, phosphate, phosphonate, hydroxide, alkoxide, phenoxide, bisphenoxide, etc.).

Many of the organo-onium compounds useful in this invention are described and known in the art. See, for example, U.S. Pat. No. 4,233,421 (Worm), U.S. Pat. No. 4,912,171 (Grootaert et al.), U.S. Pat. No. 5,086,123 (Guenthner et al.), and U.S. Pat. No. 5,262,490 (Kolb et al.), U.S. Pat. No. 5,929,169, all of whose descriptions are herein incorporated by reference. Another class of useful organo-onium compounds include those having one or more pendent fluorinated alkyl groups. Generally, the most useful fluorinated onium compounds are disclosed by Coggio et al. in U.S. Pat. No. 5,591,804.

The polyhydroxy compound may be used in its free or non-salt form or as the anionic portion of a chosen organo-onium accelerator. The crosslinking agent may be any of those polyhydroxy compounds known in the art to function as a crosslinking agent or co-curative for fluoroelastomers, such as those polyhydroxy compounds disclosed in U.S. Pat. No. 3,876,654 (Pattison), and U.S. Pat. No. 4,233,421 (Worm). One of the most useful polyhydroxy compounds includes aromatic polyphenols such as 4,4'-hexafluoroisopropylidenyl bisphenol, known more commonly as bisphenol AF. The compounds 4,4'-dihydroxydiphenyl sulfone (also known as Bisphenol S) and 4,4'-isopropylidenyl bisphenol (also known as bisphenol A) are also widely used in practice.

Prior to curing, an acid acceptor is mixed into a fluoroelastomer composition that comprises a polyhydroxy cure system. Acid acceptors can be inorganic or blends of inorganic and organic. Examples of inorganic acceptors include magnesium oxide, lead oxide, calcium oxide, calcium hydroxide, dibasic lead phosphite, zinc oxide, barium carbonate, strontium hydroxide, calcium carbonate, etc. Organic acceptors include epoxies, sodium stearate, and magnesium oxalate. The preferred acid acceptors are magnesium oxide and calcium hydroxide. The acid acceptors can be used singly or in combination, and preferably are used in amounts ranging from about 2 to 25 parts per 100 parts by weight of the fluoroelastomer.

A curable fluoroelastomer composition may comprise further additives, such as carbon black, stabilizers, plasticizers, lubricants, fillers, and processing aids typically utilized in fluoroelastomer compounding can be incorporated into the compositions, provided they have adequate stability for the intended service conditions.

Carbon black fillers are typically also employed in elastomers as a means to balance modulus, tensile strength, elongation, hardness, abrasion resistance, conductivity, and processability of the compositions. Suitable examples include MT blacks (medium thermal black) designated N-991, N-990, N-908, and N-907, and large particle size furnace blacks. When used, 1–70 phr of large size particle black is generally sufficient.

Fluoropolymer fillers may also be present in the curable compositions. Generally, from 1 to 50 parts per hundred fluoroelastomer of a fluoropolymer filler is used. The fluoropolymer filler can be finely divided and easily dispersed as a solid at the highest temperature utilized in fabrication and curing of the fluoroelastomer composition. By solid, it is meant that the filler material, if partially crystalline, will have a crystalline melting temperature above the processing temperature(s) of the fluoroelastomer(s). The most efficient way to incorporate fluoropolymer filler is by blending latices; this procedure including various kinds of fluoro polymer filler is described in U.S. application Ser. No. 09/495,600, filed 1 Feb. 2000.

The curable compositions can be prepared by mixing the fluoroelastomer, the curatives and/or catalysts, the selected additive or additives, and the other adjuvants, if any, in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. For best results, the temperature of the mixture during the mixing process typically should not rise above about 120° C. During mixing, it is preferable to distribute the components and adjuvants uniformly throughout the gum for effective cure. The mixture is then processed and shaped, for example, by extrusion (for example, in the shape of a hose or hose lining) or molding (for example, in the form of an O-ring seal). The shaped article can then be heated to cure the gum composition and form a cured elastomer article.

Pressing of the compounded mixture (i.e., press cure) usually is conducted at a temperature between about 95° C. and about 230° C., preferably between about 150° C. and about 205° C., for a period of from 1 minute to 15 hours, typically from 5 minutes to 30 minutes. A pressure of between about 700 kPa and about 20,600 kPa is usually imposed on the compounded mixture in the mold. The molds first may be coated with a release agent and prebaked. The molded vulcanizate is then usually post-cured (e.g., oven-cured) at a temperature usually between about 150° C. and about 300° C., typically at about 232° C., for a period of from about 2 hours to 50 hours or more depending on the cross-sectional thickness of the article. For thick sections, the temperature during the post cure is usually raised gradually from the lower limit of the range to the desired maximum temperature. The maximum temperature used is preferably about 300° C., and is held at this value for about 4 hours or more.

The curable fluoroelastomer compositions are useful in production of articles such as gaskets, tubing, and seals. Such articles are produced by molding a compounded formulation of the curable composition with various additives under pressure, curing the part, and then subjecting it to a post cure cycle. The curable compositions formulated without inorganic acid acceptors are particularly well suited for applications such as seals and gaskets for manufacturing semiconductor devices, and in seals for high temperature automotive uses.

The invention will now be further illustrated with reference to the following examples without the intention to limit the invention thereto. All parts and percentages are by weight unless indicated otherwise.

EXAMPLES

Test methods used:

The melt flow index (MFI) was carried out according to DIN 53735, ISO 12086 or ASTM D, 1238 at a support weight of 5.0 kg and a temperature of 265° C. or 297° C. alternatively. The MFIs cited here were obtained with a standardized extrusion die of 2.1 mm diameter and a length of 8.0 mm.

Mooney viscosities were determined in accordance with ASTM D 1646. Unless otherwise noted, the Mooney viscosity was determined from compositions containing fluoroelastomer incorporating curatives or the final compound using a 1 minute pre-heat and a 10 minute test at 121° C. (ML 1+10 @ 121° C.).

A Monsanto Processability Tester (MPT) was used to evaluate the processability of the fluoropolymer. Hereby, the pressures were determined that were required to extrude each compound at shear rates of 180, 361, 726 and 1446 l/s. The instrument was equipped with a 1.50 mm diameter die of L/D=10, all compounds were tested at 105° C. unless otherwise noted.

76×152×2 mm press cured sheets were prepared for physical property testing by pressing at 5 to 7 MPa at 163° C. for 50 minutes. From these press cured sheets, the Tensile Strength at Break and the Elongation at Break were measured according to ASTM D 412. Hardness was determined according to ASTM D2240 Method A, Shore A durometer was used. The compression set was determined according to ASTM 395-89, Method B.

Melting peaks of the fluororesins were determined according to ASTM 4591 by means of Perkin-Elmer DSC 7.0 under nitrogen flow and a heating rate of 10° C./min. The indicated melting points relate to the melting peak maximum.

In accordance with DIN 5033, the L/a/b color values were measured from press cured plates against a white ceramic plate background (standard HDF 067-01-0785) using a Dr. Lange Micro Color 2 instrument (type LGC 20-2, equipped with a norm D65 light source). As the color b-value represents the blue to yellow color axis, the b-value is the best measure to quantify discoloration—slightly negative b-values appear as blue hue and positive b-value appear as yellow.

Solution viscosity of diluted polymer solutions was determined on a 0.2% polymer solution in methylethylketone (MEK) at 35° C. in accordance to DIN 53726. A Connon-Fenske-Routine-Viskosimeter (Fa. Schott, Mainz/Germany) fulfilling ISO/DIS 3105 and ASTM D 2515 was used for the measurements.

Solution viscosities of concentrated polymer solutions (40% polymer solution in N,N'-dimethylacetamide) were measured according to DIN 53019 using a Physica Rheolab MCI rotational viscosimeter (Couette-geometry according to Z2-DIN).

Molecular weight distributions were determined by means of Size Exclusion Chromatography (SEC) recorded at 35° C. in tetrahydrofuran-UV grade. The SEC equipment consisted of a Waters 510 isocratic pump, a Perkin Elmer ISS-100 autosampler, a Waters column oven, three gel mixed bed type B columns (10 μm) from Polymer Laboratories (300 mm×7.5 mm), and a Waters 410 RI detector. The instrument was calibrated using 10 narrow distributed polystyrene standard samples (PSS, Mainz/Germany) ranging from 1280 g/mol to 7300000 g/mol. The SEC-elugrams calibrated to polystyrene were converted to the molecular weight distribution with the universal calibration procedure using the Mark-Houwink coefficients α=0.751 and K=0.045396 ml/g.

The latex particle size determination was conducted by means of dynamic light scattering with a Malvern Zetazizer 1000 HSA in accordance to ISO/DIS 13321. Prior to the measurements, the polymer latexes as yielded from the polymerizations were diluted with 0.001 mol/L KCl-solution, the measurement temperature was 20° C. in all cases.

For the evaluation of the vapor transmission (permeation rate) in accordance to ASTM D814, a mixture of 42.5% toluene, 42.5% isooctane and 15% methanol by volume was used as test fluid. Sheets of 0.75–0.90 mm thickness of each polymer composition were press-cured. 3 inch diameter samples were die cut from each sheet. Vapor transmission cups, each with a 2.5 inch opening (4.909 in$^2$ exposed sample surface) and approximately 160 ml capacity, were used and are available from Thwing-Albert Instrument Co. High fluorine, low durometer fluoroelastomer gaskets insured a good seal between sample and the test fluid. The cups were assembled by placing 100 ml of fluid in the cup, a 0.5 mm gasket between the cup and the sample, and a 1.5 mm gasket between the sample and the clamping ring. Because the samples were extensible during testing, a 16-mesh circular screen was placed between the upper gasket and the clamping ring. All tests were conducted at 40° C. for 32 days with the cup maintained in the upright position. The first 7 days of testing, no data were collected in order to allow the sample to reach vapor transmission equilibrium. Then the cups were weighted approximately every other day. The transmission rate was then multiplied by the thickness of the samples in millimeters to normalize each value.

For extractable evaluation, cured elastomer sheets were soaked in methylethylketone (MEK) for 70 hours at 40° C. After this soak period, the cured gum sheet was removed from MEK. MEK was removed from the mother liquor via distillation and the remaining residual was dried for 70 hours at 80° C. and weight.

Example 1

A polymerization vessel with a total volume of 186 l equipped with an impeller agitator system was charged with 114.6 l deionized water, 12 g oxalic acid, 51 g ammonium oxalate and 320 g perfluorooctanoate ammonium salt (APFO). The oxygen free vessel was then heated up to 45° C. and the agitation system was set to 210 rpm. The vessel was charged with 230 g methyl tertiary butyl ether (MTBE) and 190 g PPVE-2 to a pressure of 0.5 bar absolute, with PPVE-1 to 1.26 bar absolute (958 g), with ethylene to 3.52 bar absolute (198 g) and with tetrafluoroethylene (TFE) to 15.5 bar absolute (3968 g) reaction pressure. The polymerization was initiated by 70 ml of a 3.2% aqueous potassium permanganate solution. As the reaction started, the reaction pressure of 15.5 bar absolute was maintained by feeding TFE, ethylene, PPVE-1 and PPVE-2 into the gas phase with a feeding ratio ethylene (kg)/TFE (kg) of 0.2407, PPVE-1 (kg)/FE (kg) of 0.0956 and PPVE-2 (kg)/TFE (kg) of 0.008. Within the polymerization the 3.2% aqueous potassium permanganate solution was continuously charged into the vessel with a feeding rate 110 ml/h. A reaction temperature of 45° C. was maintained.

After feeding 36.6 kg TFE (236 min polymerization time), the monomer feed was interrupted and the monomer valves were closed. The addition of potassium permanganate solution was maintained at a feed rate of 40 ml h. Within 10 min, the monomer gas phase was reacted down to a vessel pressure of 7.5 bar.

The thus obtained 164.7 kg polymer dispersion consisted of latex particles having 95 nm in diameter according to dynamic light scattering.

This polymer dispersion having a solid content of 30.8% was removed at the bottom of the reactor, passed through a glass column containing DOWEX 650C cation exchange resin (Dow Chemical Co.) and subsequently transferred into a 250-l agglomeration vessel. To the polymer dispersion was added 100 l deionized water, 2.5 l concentrated hydrochloric acid and 35 l perfluoro n-heptane agglomeration aid (PF 5070 by 3M). The agglomeration vessel was agitated vigorously until the solid had fully separated from the aqueous phase. The agglomerate was washed three times with deionized water, the agglomeration aid was distilled off and the polymer was dried in an oven at 130° C. for 12 hours and another 4 hours at 200° C. to remove all residual moistures. The thus obtained 49 kg polymer showed a melting point maximum of 254° C. and a heat of fusion of 44 J/g in the DSC trace. The polymer had an MFI(297/5) of 8.5 g/10 min. At 23° C., the elongation at break was 457% and the tensile strength at break was 44.6 MPa. At 200° C., the elongation at break was 424% and the tensile strength at break was 2.7 MPa.

This example demonstrates the improved efficiency of the polymerization process using a dialkyl ether chain transfer agent (MTBE) in that the polymer solid content achieved was well above 30%. This is to be compared with for example the polymerization process disclosed in EP 43 948 which uses diethyl malonate (DEM) chain transfer agent wherein the polymer solid content that can be obtained is generally around 20 to 22%.

Example 2 to 4

In the examples 2, 3 & 4, polymers were produced following the procedure of example 1 with the exception that the amount of MTBE chain transfer agent was varied (examples 2 & 3) or that dimethylether (Me$_2$O) was used (example 4). The polymer workup was conducted the same way as in example 1. The results are summarised in table 1.

TABLE 1

|  | Example 2 | Example 3 | Example 4 |
|---|---|---|---|
| chain transfer agent | 250 g MTBE | 285 g MTBE | 310 g Me$_2$O |
| polymerisation time | 4.1 hours | 4.3 hours | 4.0 hours |
| solid content | 30.8 | 30.7 | 30.9 |
| latex particle diameter | 98 nm | 89 nm | 92 nm |
| MFI(297/5) | 14.6 | 28.9 | 21.8 |
| elongation @ break, 23° C. | 462% | 455% | 470% |
| tensile strength @ break, 23° C. | 43.7 MPa | 43.0 MPa | 43.1 MPa |
| elongation @ break, 200° C. | 186% | 15% | 32% |
| tensile strength @ break, 200° C. | 2.6 MPa | 2.1 MPa | 2.3 MPa |
| melting point | 255° C. | 257° C. | 254° C. |

As can be seen from the examples, the polymer melt viscosity can be well controlled by the amount of dialkyl ether chain transfer agent while achieving a high polymer yield and short polymerization times as well as maintaining the physical properties measured on the yielded polymer samples.

Example 5

In this example, the thermal stability of the ETFE copolymer produced from example 1 was measured and compared with similar ETFE copolymers from the prior art. Comparative sample A was a TFE/E/PPVE-1 copolymer prepared according to the polymerization process disclosed in EP 0 043 948 using DEM as a chain transfer agent. Comparative sample B was Aflon COP C-55 AX, an ETFE copolymer commercially available from Asahi Glass Company and believed to be produced in an organic medium according to the procedure disclosed in U.S. Pat. No. 4,123,602. Press cured sheets were prepared (by pressing at 6 MPa at 300° C.

for 10 min) from the ETFE copolymer of example 1 as well as of the two comparative ETFE samples A and B. Together with melt pellets of all three ETFE samples, these compression molded plates were placed into an oven that was heated to 175° C. (air atmosphere). After various heat aging times, polymer samples were taken out of the oven and their melt viscosity, the mechanical data as well as color values were measured. These data are summarised in the following tables.

TABLE 2

Heat aging data of ETFE polymer of example 1:

| storage time @ 175° C. [h] | MFI (297/5) | tensile strength @ break, 23° C. [MPa] | elongation @ break, 23° C. [%] | color b-value |
|---|---|---|---|---|
| initial values | 8.5 | 44.6 | 457 | −3.6 |
| 9 | 7.6 | 39.6 | 432 | −2.1 |
| 120 | 6.7 | 41.2 | 459 | −0.7 |
| 264 | 6.3 | 41.0 | 459 | −0.7 |
| 508 | 5.7 | 41.7 | 468 | 0.3 |
| 1008 | 5.2 | 42.7 | 459 | 0.9 |

TABLE 3

Heat aging data of comparative A:

| storage time @ 175° C. [h] | MFI (297/5) | tensile strength @ break, 23° C. [MPa] | elongation @ break, 23° C. [%] | Color b-value |
|---|---|---|---|---|
| initial values | 13.0 | 47.8 | 465 | −3.4 |
| 9 | 16.8 | 45.3 | 473 | −2.2 |
| 120 | 24 | 40.4 | 482 | −0.7 |
| 264 | 28 | 36.6 | 466 | 1.5 |
| 508 | 32 | 32.5 | 422 | 14.6 |
| 1008 | 35 | 27.2 | 184 | 30.6 |

TABLE 4

Heat aging data of comparative B:

| storage time @ 175° C. [h] | MFI (297/5) | tensile strength @ break, 23° C. [MPa] | elongation @ break, 23° C. [%] | color b-value |
|---|---|---|---|---|
| initial values | 8.9 | 50.0 | 441 | −3.6 |
| 9 | 10.2 | 46.5 | 437 | −2.6 |
| 120 | 11.4 | 43.7 | 436 | −1.9 |
| 264 | 12.6 | 38.2 | 401 | 2.0 |
| 508 | 13.7 | 35.2 | 417 | 19.0 |
| 1008 | 14.9 | 33.7 | 413 | 32.7 |

As a comparison of the different sets of the heat aging data shows, the physical properties of all three samples considered is remarkable different from each other. The comparative samples A and B undergo a subsequent decay of the melt viscosity with increasing heat aging time. The mechanical data (tensile strength and elongation at break) also follow this declination of the melt viscosity (which is a measure of the molecular weight). Additionally, both comparative materials undergo a discoloration and they are deeply discolored after 1000 h heat aging time. This is quantified: with the high color b-values.

The melt viscosity of ETFE polymer of example 1 remains stable and does not undergo a discernible thermal degradation for more than 1000 h, whereas the MFI increases with time for the comparative example. Accordingly, this example demonstrates the improved thermal stability of the ETFE polymer produced using dialkyl ether chain transfer agents compared to the prior art materials.

Example 6

A polymerization vessel with a total volume of 186 l equipped with an impeller agitator system was charged with 114.6 l deionized water, 65 g oxalic acid, 230 g ammonium oxalate and 410 g perfluorooctanoate ammonium salt (APFO). The oxygen free vessel was then heated up to 31° C. and the agitation system was set to 210 rpm. The vessel was charged with 165 g dimethylether and 4045 g hexafluoropropylene (HFP) to a pressure of 7.91 bar absolute, with 187 g ethylene to 9.71 bar absolute and with 2670 g tetrafluoroethylene (TFE) to 16.0 bar absolute reaction pressure. The polymerization was initiated by 70 ml of a 3.2% aqueous potassium permanganate solution. As the reaction starts, the reaction pressure of 16.0 bar absolute was maintained by feeding TFE, ethylene and HFP into the gas phase with a feeding ratio ethylene (kg)/TFE (kg) of 0.253 and HFP (kg)/TFE (kg) of 0.304. During polymerization a 3.2% aqueous potassium permanganate solution was continuously charged into the vessel with a feeding rate 160 ml/h. The reaction temperature of 31° C. was also maintained.

Liquid dispersion samples were taken from the running polymerization at 2.73 kg, 5.46 kg, 8.19 kg, 10.92 kg, 13.65 kg and 16.38 kg TFE monomer feed. After feeding 19.16 kg, TFE (405 min polymerization time), the monomer feed was interrupted and the monomer valves were closed. Then the reactor was vented and flushed with $N_2$ in three cycles.

The thus obtained 144.5 kg polymer dispersion with a solid content of 20.2% consisted of latex particles having 64 nm in diameter according to dynamic light scattering. The dispersion is recovered at the bottom of the reactor and worked up in analogy to Example 1 (this material is designated as "Example 6a" in the following). The same was done for the liquid dispersion samples that were taken from the running polymerization. All agglomerates were dried at 170° C. at vacuum for 16 h. The MFI(265/5) and the melting points of the samples are reported in Table 5. As can be seen from table 5, the polymerization using dimethylether as chain transfer agent only showed a marginal MFI drift of the polymer generated during the polymerization process.

TABLE 5

Analytical data of samples from polymerization of Example 6a

| Sample taken at kg TFE feed | MFI(265/5) [g/10 min] | Tm [° C.] |
|---|---|---|
| 2.73 | 8.9 | 209.0 |
| 5.46 | 8.5 | 210.0 |
| 8.19 | 9.4 | 210.5 |
| 10.92 | 10.1 | 211.2 |
| 13.65 | 9.6 | 210.3 |
| 16.38 | 10.6 | 209.6 |
| 19.16 (final sample) | 10.8 | 209.4 |

A comparative polymerization (herein referred as "Example 6b") was carried out under similar conditions as example 6a with the exception that 72 g diethylmalonate (DEM) was used as chain transfer agent instead of dimethylether. Liquid dispersion samples were also taken from this polymerization, the reaction took 430 minutes. The work-up of the samples as well as the drying conditions were the same as for Example 6a, the analytical data of the samples are reported in Table 6.

TABLE 6

Analytical data of samples from polymerization of Example 6b

| Sample taken at kg TFE feed | MFI(265/5) [g/10 min] | Tm [° C.] |
|---|---|---|
| 2.73 | 295 | 211.3 |
| 5.46 | 135 | 211.0 |
| 8.19 | 64 | 211.1 |
| 10.92 | 28 | 209.7 |
| 13.65 | 16.6 | 208.0 |
| 16.38 | 10.4 | 207.4 |
| 19.16 (final sample) | 8.3 | 207.8 |

In comparison to example 6a, this polymerization using diethylmalonate as chain transfer agent showed a significant MFI drift of the polymer during the polymerization process. If the MFI values of Table 6 are plotted versus the TFE monomer feed, a MFI value in the order of 500 g/10 min can be extrapolated for the polymer material that is generated in the first 5% of the monomer feed. This corresponds to a low molecular weight fraction of about 5%. This low molecular weight fraction is not present in the polymer of example 6a.

This finding was further confirmed by an extraction analysis carried out on the samples as follows: 100 g dried agglomerate of the TFE/HFP/ethylene-terpolymer sample of Example 6a was placed into a Soxhlet extraction apparatus, a glass cylinder bearing a glass frit in the bottom was used as the sample holder. The polymer was extracted for 5 days with acetone, the total extraction period was 33 h. After this extraction period, the acetone was fully removed in a rotation evaporator under reduced pressure. 0.34 g of the dried residual remained in the glass flask. 26% of this extractable was soluble in cold acetone, its solution viscosity in (MEK @ 35° C.) was 5 ml/g. The same extraction procedure was carried out with polymer sample of Example 6b yielding an extraction amount of 2.32 g. 22% of this extractable was soluble in cold acetone. Indicative for a very low molecular weight, its solution viscosity in (MEK @ 35° C.) was 7 ml/g.

From the soluble extractable fraction of Example 6b, some vapor pressure data were recorded via a distillation under reduced pressure using standard lab equipment. The material was placed into a small glass tube (10 ml volume) equipped with a PTFE needle value and a mercury thermometer and connected to a standard mercury manometer with U tube geometry. The glass tube was vented to 16 mbar and subsequently heated up with a hot oil bath until the evaporation of the extractable occurred. Under reflux conditions the approximate equilibrium temperature was recorded. With this method, the equilibrium vapor temperature was measured at different predefined pressures (adjustable at the PTFE needle value). After measuring the vapor pressure at 240° C. the material was thermally degraded as could be seen by a dark discoloration of the extractable. The vapor pressure data are summarized in Table 7.

TABLE 7

Vapor pressure data of the extractable of Example 6b

| T [° C.] | p [mbar] |
|---|---|
| 160 | 16 |
| 168 | 26 |
| 190 | 56 |
| 205 | 68 |

TABLE 7-continued

Vapor pressure data of the extractable of Example 6b

| T [° C.] | p [mbar] |
|---|---|
| 215 | 90 |
| 223 | 100 |
| 240 | 132 |

The vapor pressure data of Table 7 plotted in an Arrhenius plot (ln {p} versus 1/T) yields the enthalpy of evaporation of the low $M_w$ extractable to be $\Delta H_{evap.}$=47.2 kJ/mol. A linear extrapolation of these vapor pressure data to 297° C. yields a vapor pressure p=450 mbar at 297° C. This analysis shows that the low molecular weight extractable fraction in example 6b has a vapor pressure nearly in the order of the normal pressure under usual processing temperatures of the TFE/HFP/ethylene-terpolymer. This has consequences for the thermal stability of the fluororesin as the following investigation showed:

The agglomerates of the TFE/HFP/ethylene terpolymer samples of Example 6a & Example 6b were examined for their thermal stability in a standard melt indexer. In deviation of DIN 53735, ISO 12086 and ASTM D-1238, the polymer melt was exposed to 297° C. for one hour, before the 5 kg weight was applied. As the visual inspection of the extruded monofils showed, the MFI strand of Example 6a was not discolored and did not contain any bubbles, whereas the MFI strand of Example 6b was brown discolored and contained many bubbles. This demonstrates, that the thermal stability of fluoropolymers produced via the process of the invention is greatly improved compared to prior art polymers.

Example: 7

As a comparative example to example 8, a prior art material as disclosed in U.S. Pat. No. 5,256,745 & U.S. Pat. No. 5,208,305 was prepared according to the following procedure:

A fluoroelastomer precursor was prepared in the form of a latex ("Latex I") by aqueous emulsion polymerization. A polymerization vessel with a total volume of 47.5 l equipped with an impeller agitator system was charged with 29 l deionized water, 118.6 g hexamethyldisilane (chain transfer agent) and 80 g FC-128 fluorosurfactant ($C_8F_{17}SO_2N(C_2H_5)$ $CH_2COO^-K^+$ salt of 3M Company). The oxygen free vessel was then heated up to 71° C. and the agitation system was set to 240 rpm. The vessel was charged with hexafluoropropylene (HFP) to 4.34 bar absolute, with vinylidenefluoride (VDF) to 7.88 bar absolute and with tetrafluoroethylene (TFE) to 9.5 bar absolute reaction pressure. The polymerization was initiated by the addition of 109 g ammonium peroxodisulfate (APS) dissolved in water. As the reaction started, the reaction pressure of 9.5 bar absolute was maintained by feeding TFE, VDF and HFP into the gas phase with a feeding ratio TFE (kg)/VDF (kg) of 0.705 and HFP (kg)/VDF (kg) of 1.185. The reaction temperature of 71° C. was also maintained. After feeding 3.96 kg VDF in a total reaction time of 6.5 hours, the monomer feed was interrupted and the monomer valves were closed. The reactor was vented and flushed with $N_2$ in three cycles. The thus obtained 40.4 kg polymer dispersion with a solid content of 28.3% was recovered at the bottom of the reactor, it consisted of latex particles having 92 nm in diameter according to dynamic light scattering. 100 ml of this polymer dispersion was coagulated by adding it drop-wise to an aqueous MgCl₂ solution with agitation, after which it was de-watered and washed three times with deionized water (60–70° C.). The polymer was dried overnight at 130° C. in an air circulating oven. The polymer had the appearance of a brown syrup and showed a solution viscosity of 14 ml/g.

A second fluoroelastomer precursor was prepared in the form of a latex ("Latex 2") by aqueous emulsion polymerization in the same reactor as for the preparation of "Latex I" using 29 l deionized water and 160 g FC-128 fluorosurfactant. No chain transfer agent was utilized in this polymerization. After heating up the vessel to 71° C., setting the agitation system to 240 rpm and degazing and charging with nitrogen in three cycles, the vessel was charged with hexafluoropropylene (HFP) to 4.21 bar absolute, with vinylidenefluoride (VDF) to 7.34 bar absolute and with tetrafluoroethylene (TFE) to 8.8 bar absolute reaction pressure. The polymerization was initiated by the addition of 21 g ammonium peroxodisulfate (APS) dissolved in water. As the reaction started, reaction temperature of 71° C. as well as the reaction pressure of 8.8 bar absolute was maintained by feeding TFE, VDF and HFP into the gas phase with a feeding ratio TFE (kg)/VDF (kg) of 0.705 and HFP (kg)/VDF (kg) of 1.185. After feeding 3.96 kg VDF in a total reaction time of 8.0 hours, the monomer feed was interrupted and the monomer valves were closed. The reactor was vented and flushed with N₂ in three cycles. The thus obtained 40.3 kg polymer dispersion with a solid content of 28.2% was recovered at the bottom of the reactor and 85 g of wet coagulate was removed from the dispersion via filtration of the dispersion through a filter with 80 μm mesh size. The dispersion consisted of latex particles having 104 nm in diameter according to dynamic light scattering. 100 ml of this polymer dispersion was worked up the same way as Latex 1, the raw polymer had a nearly white appearance and showed a solution viscosity of 108 ml/g.

Latex 1 and Latex 2 were blended undiluted such that the solid polymers were in the ratio of 50:50 by weight. The latex was coagulated by adding it drop-wise to an aqueous MgCl₂ solution with agitation, after which it was de-watered and washed three times with deionised water (60–70° C.). The polymer was dried overnight at 130° C. in an air circulating oven. The raw polymer had a slightly discolored appearance and showed a solution viscosity of 59 ml/g. As shown by size exclusion chromatography (SEC), the polymer exhibited a distinct bimodal molecular weight distribution (MWD): The separate peak at low molecular weights had a mass average molecular weight of $M_w$=10.700 g/mol, a polydispersity of $M_w/M_n$=2.2 and an area of 55% of the total MWD. The separate peak at high molecular weights had a mass average molecular weight of $M_w$=200.000 g/mol, a polydispersity of $M_w/M_n$=1.9 and an area of 45% of the total MWD. The overall polydispersity of the sample was $M_w/M_n$=11.2.

Example 8

A polymerization vessel with a total volume of 47.5 l equipped with an impeller agitator system was charged with 29 l deionized water, 1.3 g sodiumdisulfite (Na₂S₂O₅), 84 g perfluorooctanoate ammonium salt (APFO). The oxygen free vessel was then heated up to 70° C. and the agitation system was set to 240 rpm. The vessel was charged with 1.4 g methyl tertiary butyl ether (MTBE) and with hexafluoropropylene (HFP) to 10.18 bar absolute (1192 g), with vinylidenefluoride (VDF) to 13.52 bar absolute (175 g) and with tetrafluoroethylene (TFE) to 15.5 bar absolute (184 g) reaction pressure. The polymerization was initiated by the addition of 40 g ammonium peroxodisulfate (APS) dissolved in water. As the reaction starts, the reaction pressure of 15.5 bar absolute was maintained by feeding TFE, VDF and HFP into the gas phase with a feeding ratio TFE (kg)/VDF (kg) of 0.705 and HFP (kg)/VDF (kg) of 1.185. The reaction temperature of 70° C. was also maintained.

After feeding 2.51 kg VDF (corresponds to 50% monomer target feed after 65 min polymerization time), a portion of 68 g MTBE chain transfer agent was added into the vessel which resulted in a drastic declination of the monomer uptake. The monomer feed was maintained for another polymerization period of 200 min, until the monomer feed 5.01 kg VDF was completed. The monomer feed was interrupted and the monomer valves were closed. Within 10 min, the monomer gas phase was reacted down to a vessel pressure of 8.6 bar, then the reactor was vented and flushed with N₂ in three cycles.

The thus obtained 43.5 kg polymer dispersion with a solid content of 33.3% was recovered at the bottom of the reactor, it consisted of latex particles having 114 nm in diameter according to dynamic light scattering.

5.0 l of this polymer dispersion was freeze coagulated over night in a refrigerator. After thawing the material, the thus obtained sponge-like raw polymer was washed five times with demineralized water, the polymer was squeezed out and dried for 12 h in an oven at 130° C. The polymer was transparent and did not show any sign of discoloration, it had a MFI(265/5) of 12.5 g/10 min and a solution viscosity of 69 ml/g. As determined by size exclusion chromatography (SEC), the polymer exhibited a distinct bimodal molecular weight distribution (MWD): The separate peak at low molecular weights had a mass average molecular weight of $M_w$=13.300 g/mol, a polydispersity of $M_w/M_n$=2.2 and an area of 54% of the total MWD. The separate peak at high molecular weights had a mass average molecular weight of $M_w$=276.000 g/mol, a polydispersity of $M_w/M_n$=1.9 and an area of 46% of the total MWD. The overall polydispersity of the sample was $M_w/M_n$=12.2.

100 parts of the polymer were mixed on a two roll mill with the following ingredients:

5.95 (mmhr) Bisphenol AF 0.54 (mmhr) of the following phosphonium complex

which is tributylmethoxy propyl phosphonium chloride prepared from tributyl phosphene (available from Cytec) allylchloride and methanol and then reacting with the sodium salt of Bisphenol AF.

1.03 (mmhr) of a further complex which is a complex prepared by reacting tributylmethoxy propyl phosphonium chloride with the sodium salt of perfluoroctyl-n-methylsulfonamide.

After measuring the Mooney viscosity of the curative blend ("ML 1+10 @ 121° C. incorporated cure"), the following other compounding ingredients were added: 3 g per hundred gram (phr) magnesium oxide (Elastomag 170 from Morton International) and 6 phr calcium hydroxide and 13 phr carbon black (N762). The composition was prepared in the form of individual sheets measuring 76×152×2 mm by pressing at 5–7 MPa at 163° C. for 50 min. The same curing procedure was conducted on the prior art polymer sample described in example 7. Finally, both cured compounds were tested and compared for various properties according to the test methods set forth above. The test results are reported in Table 8.

TABLE 8

|  | comparative Example 7 | Example 8 |
|---|---|---|
| MFI(265/5), raw gum [g/10 min] | 17.9 | 12.5 |
| solution viscosity, MEK @ 35° C. [ml/g] | 56 | 69 |
| $M_w/M_n$ (SEC measurement) | 11.2 | 12.2 |
| ML 1 + 10 @ 121° C. incorporated cure | 31 | 34 |
| ML 1 + 10 @ 121° C. compound | 57 | 58 |
| Physical properties of press cured sheet |  |  |
| Durometer, shore A | 68 | 64 |
| Peak Stress [Mpa] | 9.9 | 11.0 |
| Peak Strain % | 295 | 235 |
| 100% Modulus [MPa] | 2.8 | 3.2 |
| Processing Evaluation (MPT), 105° C. |  |  |
| Zone 1, 180 s$^{-1}$ [MPa] | 23.4 | 21.2 |
| Zone 2, 361 s$^{-1}$ [MPa] | 25.5 | 24.0 |
| Zone 3, 723 s$^{-1}$ [MPa] | 28.2 | 26.6 |
| Zone 4, 1446 s$^{-1}$ [MPa] | 32.7 | 30.1 |
| Processing Evaluation (MPT), 120° C. |  |  |
| Zone 1, 180 s$^{-1}$ [MPa] | 19.2 | 19.9 |
| Zone 2, 361 s$^{-1}$ [MPa] | 21.7 | 21.6 |
| Zone 3, 723 s$^{-1}$ [MPa] | 24.5 | 23.9 |
| Zone 4, 1446 s$^{-1}$ [MPa] | 28.1 | 26.5 |
| Compression set of, cured sheet [%] | 19 | 6 |
| Wt % Extractables | 13.6 | 5.7 |
| Permeation, CM14 @ 40° C. [g · mm/m$^2$ · d] | 55 | 51 |

This example demonstrates that the bimodal molecular weight distribution of the prior art material described in Example 7 can be generated in only one single-step polymerization using a very effective and easy to handle dialkylether as chain transfer agent. The polymerization of the bimodal single-step process is faster than each precursor polymerization described in Example 7. Furthermore, any blending procedure involved in the polymer workup is avoided. Compared to the polymer of example 7, the fluoroelastomer prepared with the process of the invention showed a unique combination of better processing characteristics (see processing evaluation), together with better mechanical data (see compression set), a lower vapor transmission (permeation) and a reduced extractable levels.

Example 9

A polymerization vessel with a total volume of 186.1 l equipped with an impeller agitator system was charged with 114.6 l deionized water, 8 g oxalic acid, 47 g ammonium oxalate and 298 g perfluorooctanoate ammonium salt (APFO). In three subsequent cycles, the vessel was degassed and subsequently charged with nitrogen to assure that all oxygen had been removed. The vessel was then heated up to 60° C. and the agitation system was set to 210 rpm. The vessel was charged with 132 g dimethylether (Me$_2$O) and 2472 g hexafluoropropylene (HFP) to a pressure of 5.84 bar absolute, with 1305 g vinylidenefluoride (VDF) to 12.18 bar absolute and with 1143 g tetrafluoroethylene (TFE) to 15.5 bar absolute reaction pressure. The polymerization was initiated by 55 ml of a 2.4% aqueous potassium permanganate solution. As the reaction started, the reaction pressure of 15.5 bar absolute was maintained by feeding TFE, VDF and HFP into the gas phase with a feeding ratio VDF (kg)/TFE (kg) of 1.219 and HFP (kg)/TFE (kg) of 0.484. Within the polymerization, the 2.4% aqueous potassium permanganate solution was continuously charged into the vessel with a feeding rate of 120 ml/h. A reaction temperature of 60° C. was maintained.

After feeding 21.8 kg TFE (220 min polymerization time), the monomer feed was interrupted and the monomer valves were closed, but the addition of potassium permanganate solution was maintained at a feed rate of 40 ml/h. Within 10 min, the monomer gas phase was reacted down to a vessel pressure of 9.7 bar; then the reactor was vented and flushed with N$_2$ in three cycles.

The thus obtained 173.4 kg polymer dispersion consisted of latex particles having 118 nm in diameter according to dynamic light scattering.

This polymer dispersion having a solid content of 33.8% was recovered at the bottom of the reactor, passed through a glass column containing DOWEX 650C cation exchange resin (Dow Chemical Co.) and subsequently transferred into a 250-l agglomeration vessel. To the polymer dispersion was added 100 l deionized water, 2.5 l concentrated hydrochloric acid and 35 l perfluoro n-heptane agglomeration aid (PF 5070 by 3M). The agglomeration vessel was agitated vigorously until the solid has fully separated from the aqueous phase. The agglomerate was washed three times with: deionized water, the agglomeration aid was distilled off and the polymer was dried in an oven at 70° C. for 24 hours. The thus obtained 58 kg polymer showed a melting point maximum of 100° C., the melt viscosity was MFI(265/5) 151 g/10 min. The MFI strand was translucent and showed no sign of discoloration and no bubbles. As shown by size exclusion chromatography (SEC), the polymer had a unimodal, symmetrical Gaussian shaped molecular weight distribution (MWD) with a mass average molecular weight of $M_w$=49.300 g/mol and a polydispersity of $M_w/M_n$=11.69. For this polymer, the solution viscosity of a 40% polymer solution in N,N'-dimethylacetamide was measured at different temperatures. These data are summarized in table 9.

TABLE 9

| shear rate [1/s] | □ @ 20° C. [Pa · s] | □ @ 50° C. [Pa · s] | □ @ 70° C. [Pa · s] | □ @ 85° C. [Pa · s] |
|---|---|---|---|---|
| 18.5 | 18.8 | 6.55 | 3.62 | 2.50 |
| 23.2 | 19.1 | 6.58 | 3.65 | 2.52 |
| 29.2 | 19.3 | 6.59 | 3.65 | 2.52 |
| 36.7 | — | 6.61 | 3.66 | 2.53 |
| 46.0 | — | 6.65 | 3.68 | 2.54 |
| 58.1 | — | 6.66 | 3.69 | 2.54 |
| 73.0 | — | 6.68 | 3.71 | 2.55 |
| 91.9 | — | 6.69 | 3.72 | 2.56 |
| 116 | — | — | 3.75 | 2.57 |
| 146 | — | — | 3.77 | 2.58 |

A polymerisation conducted under the same conditions but using 120 g of methoxy-2H-perfluorisobutylene (methanol adduct of perfluorisobutylene; a typical chain transfer agent for the semifluorinated components disclosed in WO 00/32655) instead of 132 g dimethylether was completed in 150 min reaction time. The so-obtained resin had a melt viscosity too high to be determined by means of a standard melt index instrument—even with a load of 21.6 kg the MFI (265/21.6) was 0 g/10'.

This example demonstrates the preparation of translucent and highly soluble fluoropolymers using the aqueous emulsion polymerization process with dialkylethers as chain transfer agents. Because of the high chain transfer activity of the dialkylethers, also low molecular weight polymers can be made while maintaining a good productivity of the polymerization process (high solid content in short reaction times). At 265° C. processing temperatures, these polymers are thermally stable and do not undergo thermal degradation which would result in discoloration. Because of the low molecular weights, even highly concentrated polymer solutions have a low viscosity. Therefore, the polymers made with the process of the invention can be used for any solution coating application of fluoropolymers involving e.g. as cladding material for polymer optical fibers (POF), as coating material of translucent fabrics or as primer material for fluoropolymers to other substrates (e.g. to glass surfaces).

Example 10

A polymerization vessel with a total volume of 186.1 l equipped with an impeller agitator system was charged with 114.6 l deionized water, 5 g sodium disulfite ($Na_2S_2O_5$) 298 g perfluorooctanoate ammonium salt (APFO). In three subsequent cycles, the vessel was degassed and subsequently charged with nitrogen to assure that all oxygen had been removed. The vessel was then heated up to 70° C. and the agitation system was set to 210 rpm. The vessel was charged with 60 g dimethylether ($Me_2O$) and 2241 g hexafluoropropylene (HFP) to a pressure of 6.0 bar absolute and with 1882 g vinylidenefluoride (VDF) to 15.5 bar absolute reaction pressure. The polymerization was initiated by the addition of 160 ml 30% aqueous ammonium peroxodisulfate (APS) solution. As the reaction started, the reaction pressure of 15.5 bar absolute was maintained by the feeding VDF and HFP into the gas phase with a feeding ratio HFP (kg)/VDF (kg) of 0.632. After feeding 17.65 kg VDF, the HFP valve was closed and only VDF was fed. When a total feed of 23.15 kg VDF was reached, the HFP valve was opened again and the pressure was maintained by the feeding VDF and HFP with a feeding ratio of HFP (kg)/VDF (kg)=0.204.

When a VDF feed of 43.81 kg was reached in 250 min polymerization time, the monomer feed was interrupted and the monomer valves were closed. Within 15 minutes, the monomer gas phase was reacted down to a vessel pressure of 4.8 bar. Then the reactor was vented and flushed with $N_2$ in three cycles.

The thus obtained 173.8 kg polymer dispersion with a solid content of 34.4% was recovered at the bottom of the reactor and transferred into a 250-l agglomeration vessel. The further workup of the polymer was carried out the same way as for Example 8. The thus obtained 59 kg polymer is a free flowing agglomerate. This material shows a melting point maximum of 113° C. and a heat of fusion of 4.3 J/g, the melt viscosity is MFI(265/5) 7.6 g/10 min.

On a polyolefin blown mold film line, the performance of this particular material was tested as a polymer melt processing additive. The polyolefin used for the test was the commercially available butene modified linear low density polyethylene (LLDPE) grade Exxon 1001.32 (MFI(190/2.16) of 1 g/10 min). A masterbatch of the fluoropolymer was compounded to 3 wt % additive concentration in DFDA 7042 carrier resin (MFI(190/2.16) of 2 g/10 min). The blending with LLDPE was accomplished by tumble blending the base resin with the masterbatch prior to extrusion, the thus obtained concentration of the fluoropolymer in the LLDPE was 750 ppm. The extrusion experiments were carried out on a 4.44 m lab scale blown film line equipped with a 25 mm Collin twin screw extruder having a length/diameter ratio of 24/1, a 18/35/60 mesh screen pack, a 40 mm die with a 2 mm die gap and a single lip air ring. The extruder output was 12.7 kg per hour, the temperature profile was the following:

| | |
|---|---|
| zone 1: | 170° C. |
| zone 2: | 175° C. |
| zone 3: | 185° C. |
| zone 4: | 195° C. |
| die: | 200° C. |

The efficiency of the fluoropolymer was assessed by the reduction of the gate pressure and by the time required to completely eliminate the melt fracture during blown film extrusion of the LLDPE. Further on, the performance of the fluoropolymer of this example to eliminate the melt fracture was compared to a VDF/HFP-copolymer as disclosed in U.S. Pat. No. 5,106,911, U.S. Pat. No. 5,464,904 and U.S. Pat. No. 5,710,217 (see comparative example in table 10). The results are summarized in Table 10.

TABLE 10

| | Example 9 | comp. example |
|---|---|---|
| initial gate pressure [PSI] | 4750 | 4650 |
| time for complete melt facture elimination [min] | 40 | 45 |
| gate pressure (melt facture 100% eliminated) [PSI] | 3600 | 3650 |
| ΔP [%] | 24.2 | 21.5 |

This example demonstrates that the fluorinated copolymer produced via the process of the invention is more efficient as the prior art polymer processing additive, because a larger extrusion pressure drop in a shorter processing time is provided. Further, this example has the additional advantage that it is a free flowing material which significantly simplifies the handling of the fluorinated copolymer as well as the preparation of masterbatches of the processing aid.

What is claimed is:

1. Fluoropolymer having a multi-modal molecular weight distribution and comprising less than 12% by weight of extractable compounds as measured by leaving the fluoropolymer in methyl ethyl ketone for 70 hours at 40° C.

2. Fluoropolymer according to claim 1 having a bimodal molecular weight distribution.

3. Fluoropolymer according to claim 1 wherein said fluoropolymer is a fluoroelastomer.

4. Core-shell fluoropolymer having less than 12% by weight of extractable compounds as measured by leaving the fluoropolymer in methyl ethyl ketone for 70 hours at 40° C.

5. Core-shell fluoropolymer having an amorphous core and a semi-crystalline shell.

* * * * *

UNITED STATES PATENT AND TRADEMARK OFFICE
CERTIFICATE OF CORRECTION

PATENT NO.    : 6,861,490 B2
DATED         : March 1, 2005
INVENTOR(S)   : Kaspar, Harald It is certified that error appears in the above-identified patent and that said Letters Patent is hereby corrected as shown below:

Column 2,
Line 67, "m is 24" should be shown as -- m is 2-4 --

Column 3,
Line 2, "2 mm" should be shown as -- $2\mu$m --

Column 4,
Line 4, delete ";" after the words "patents to"
Line 29, The words "It has been found….." should be the start of a new paragraph Column 6,
Line 20, delete ";", after the words "will depend on"

Column 11,
Lines 31-32, "0.1 and parts per hundred" should read -- 0.1 and 10 parts per hundred --

Column 12,
Lines 5-6, "organoonium" should be shown as -- organo-onium --

Column 15,
Line 36, "114.61" should be shown as -- 114.6 I --
Line 50, "(kg)J/FE" should be shown as -- (kg)/TFE --
Line 58, "40 ml h" should be shown as -- 40 ml/h --

Column 17,
Line 59, delete ":" after the words "This is quantified"

Column 18,
Line 62, "carried out under 10 similar..." should be shown as -- carried out under similar... --

UNITED STATES PATENT AND TRADEMARK OFFICE
CERTIFICATE OF CORRECTION

PATENT NO. : 6,861,490 B2
DATED : March 1, 2005
INVENTOR(S) : Kaspar, Harald

It is certified that error appears in the above-identified patent and that said Letters Patent is hereby corrected as shown below:

Column 24,
Line 18, delete ":" after the words "washed three times with"
Line 28, "$M_w/M_n = 11.69$" should be shown as -- $M_w/M_n = 1.69$ --

Signed and Sealed this

Twenty-fourth Day of May, 2005

JON W. DUDAS
*Director of the United States Patent and Trademark Office*